(12) United States Patent
Kihara et al.

(10) Patent No.: US 7,922,872 B2
(45) Date of Patent: Apr. 12, 2011

(54) DISTILLATION APPARATUS

(75) Inventors: Hitoshi Kihara, Chiba (JP); Takashi Kambe, Tsuchiura (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 572 days.

(21) Appl. No.: 11/984,923

(22) Filed: Nov. 26, 2007

(65) Prior Publication Data

US 2008/0121512 A1 May 29, 2008

(30) Foreign Application Priority Data

Nov. 28, 2006 (JP) ................................ P2006-319798

(51) Int. Cl.
*B01D 3/14* (2006.01)
(52) U.S. Cl. ....... 202/154; 159/16.1; 202/173; 202/186; 202/201; 203/5; 203/49; 203/78; 203/DIG. 9
(58) Field of Classification Search ................ 159/16.1, 159/DIG. 8; 202/154, 155, 160, 161, 172, 202/173, 186, 198, 201, 258; 203/5, 49, 203/71, 78, 80, DIG. 9
See application file for complete search history.

(56) References Cited

U.S. PATENT DOCUMENTS

| | | | |
|---|---|---|---|
| 2,820,001 A | | 1/1958 | Van Dijck et al. |
| 4,543,446 A | * | 9/1985 | Foss et al. ................... 174/11 R |
| 6,134,915 A | | 10/2000 | Denzau et al. |
| 6,321,565 B1 | * | 11/2001 | Kihara et al. ................... 62/643 |
| 6,835,287 B1 | * | 12/2004 | Kihara et al. ................. 202/154 |
| 7,297,237 B2 | * | 11/2007 | Asano et al. ...................... 203/5 |
| 7,368,601 B2 | * | 5/2008 | Yada et al. ..................... 562/600 |
| 2005/0044886 A1 | | 3/2005 | Okasinski et al. |

FOREIGN PATENT DOCUMENTS

GB 467 617 A 6/1937

OTHER PUBLICATIONS

Yamamoto, "Atomic Energy Chemical Engineering", Nikkan Kogyo Shimbun, Ltd., 1976, pp. 10-48 (*concise explanation*).
Kanbe et al., "Development of Oxygen-18 Separation Unit by Oxygen Distillation", No. 23, pp. 20-25 (*abstract*).
Kihara et al., "Development of Oxygen-18 Separation Unit by Oxygen Distillation", No. 23, pp. 14-19 (*abstract*).
Extended European Search Report in 07 254 585.8 dated Jun. 1, 2010.

* cited by examiner

*Primary Examiner* — Virginia Manoharan
(74) *Attorney, Agent, or Firm* — Nixon & Vanderhye P.C.

(57) ABSTRACT

A distillation apparatus of the present invention includes a distillation column group in which a plurality of distillation columns including a condenser and a reboiler is connected in the form of a cascade; a gas-feeding line which feeds gas from the distillation column to a latter distillation column; a gas line which introduces the gas from the distillation column to the condenser attached to the distillation column; a liquid-line which withdraws a condensed liquid from the condenser; a liquid-reflux line which introduces a part of the condensed liquid from the liquid-line to the distillation column; a liquid-return line which returns the remainder of the condensed liquid from the liquid-line to a former distillation column; a valve provided on the liquid-return line; and a bypass line which connects the liquid-return line and the gas line so as to flow an evaporated gas generated in the liquid-return line to the gas line.

7 Claims, 6 Drawing Sheets

DISTILLATION APPARATUS

CROSS-REFERENCE TO RELATED APPLICATION

This application claims priority to Japanese Patent Application No. 2006-319798, filed Nov. 28, 2006, the contents of which are incorporated herein by reference.

BACKGROUND OF THE INVENTION

1. Field of the Invention

The present invention relates to a distillation apparatus for performing distillation of a cryogenic fluid, in which a plurality of distillation columns is connected in the form of a cascade. In particular, the present invention relates to a distillation apparatus which is suitable for enrichment of stable isotopes ($^{13}C$, $^{15}N$, $^{17}O$, $^{18}O$, etc.) of carbon, nitrogen, oxygen, etc. which exist in only little amounts in nature.

2. Description of Related Art

Stable isotopes ($^{13}C$, $^{15}N$, $^{17}O$, $^{18}O$, etc.) of carbon, nitrogen, oxygen, etc. are used as a tracer in the fields of natural science and medical care. As an enrichment method of these isotopes which exist in only little amounts in nature, there is a cascade process which uses a plurality of distillation columns.

Cascade means connecting a plurality of distillation columns in series. In order to continuously concentrate a specified component in raw materials, the component concentrated in a distillation column is further concentrated in a latter distillation column, and again concentrated in a further latter distillation column. That is, a continuous distillation process is performed by a plurality of divided distillation columns. In this respect, a cascade process is different from a process seen in a general chemical process, which combines a plurality of distillation columns in which a component to be concentrated is different from the others.

A cascade process is a technique which is mainly used in the field of isotope enrichment. This cascade process enables enrichment by distillation for a structural isomer or an isotope which has a separation factor (also referred to as relative volatility) of almost 1, requires a very large number of theoretical plates, and is difficult to be separated.

Hereinafter, an example of a conventional cascade process is described. In a cascade process, as a method of exchanging a material between adjacent distillation columns, i.e. a connection method, there are methods shown in FIG. 2 to FIG. 5 (see non-patent references 1 to 3).

The distillation apparatus shown in FIG. 2 is an example of the simplest distillation cascade. This example of a distillation apparatus is composed of a distillation column group in which 6 distillation columns D1 to D6 are connected in series. The distillation columns D1 to D3 constitute a recovery part, and the distillation columns D3 to D6 constitute an enrichment part. In the distillation columns D1 and D2, the condensers C1 and C2 are provided on the tops thereof. In the distillation column D4 to D6, the reboilers R4 to R6 are provided on the bottoms thereof. In the distillation columns D3, the condenser C3 is provided on the top thereof, and the reboiler R3 is provided on the bottom thereof.

A feed gas F is fed into the distillation column D3. Then, the desired component is concentrated and withdrawn from the bottom part of the distillation column D6 as a product P, and the others are withdrawn from the top part of distillation column D1 as waste components W.

In the distillation column D3 to which the feed gas F is fed, the distillation load is the largest. The load becomes gradually small toward the last column D6 in the enrichment part and toward the first column D1 in the recovery part (that is, the column diameter becomes small).

In the example of this apparatus, the returns of gases from the last column D6 to the fifth column D5, from the fifth column D5 to the fourth column D4, . . . , and from the second column D2 to the first column D1 are performed by using pressure differences. Therefore, the pressure of a distillation column needs to be high toward the last column D6 from the first column D1. As a result, a separation factor (=relative volatility) also becomes small, thereby resulting in a disadvantage with respect to distillation efficiency.

In this case, when liquid pumps P1 to P5 are used to flow the liquid of a distillation column to the latter column, liquid is accumulated in the pumps. Therefore, the liquid hold-up over the whole apparatus is increased. This results in the disadvantage that startup time becomes long.

Also, in the case of cryogenic distillation, the use of a liquid pump causes an increase in heat inleak, thereby resulting in a disadvantage in this respect.

The distillation apparatus shown in FIG. 3 is another example of conventional art. The distillation columns thereof have the same features as the example of the apparatus shown in FIG. 2. In this example, pressures at the tops are decreased, and pressures at the tops of all the distillation columns D1 to D6 are the same. This apparatus can prevent a pressure from increasing toward the last column D6, but requires a pressurizing device such as blowers B1 to B5, resulting in a disadvantage with respect to reliability of the apparatus. Also, the disadvantages regarding the use of the liquid pumps P1 to P5 are not solved.

The example shown in FIG. 4 is an example of conventional art which is the developed version of the apparatus shown in FIG. 3. In a similar manner to the apparatus shown in FIG. 3, pressures at tops of all distillation columns D1 to D6 are decreased. On all the distillation columns D1 to D6, the condensers C1 to C6 and the reboilers R1 to R6 are provided, and a gas is fed into a latter column by the pressure difference between distillation columns (corresponding to pressure loss in the case where pressures at tops are the same).

In this apparatus, because liquid pumps are not used, it is possible to decrease liquid hold-up. However, the disadvantage in that the blowers B1 to B5 are required to return a gas is not solved.

The distillation apparatus shown in FIG. 5 is a modified example of the apparatus shown in FIG. 4. In this example, blowers used for returning is omitted, and instead, the liquid obtained by liquefaction in condensers C1 to C6 is stored in liquid-return lines Q1 to Q5 so as to return this liquid to a former column by the liquid head pressure (liquid head) therein.

In this apparatus, both the feeding and returning devices do not require a rotary machine such as a pump or a blower, reliability of this apparatus is improved, and liquid hold-up in a liquid-return line can be minimized, thereby resulting in an advantage with respect to reduction of startup time. Also, there is an advantage that pressures of all the distillation columns D1 to D6 are low because it contributes to increase a separation factor. However, a condenser and a reboiler are required for every distillation column, resulting in a disadvantage with respect to cost of the apparatus.

In a cascade process which is used in enrichment of a structural isomer or an isotope, the full length of a distillation column becomes very long, and the amount of liquid hold-up is increased necessarily. Also, the separation factor is small. Therefore, the problem in that startup time becomes long occurs.

As a result, in the aforementioned cascade method, the distillation apparatus shown in FIG. 5 can be the best because the separation factor is larger than those of the other distillation apparatus, there is not a lot of liquid hold-up, and a rotary machine is not required for each distillation column.

However, the distillation apparatus shown in FIG. 5 also has disadvantages. For example, there is the following disadvantage. In a process such as cryogenic separation for $O_2$, CO, NO, $CH_4$, $N_2$, etc., which is operated at a lower temperature than ambient temperature, a part of the liquid stored in a liquid-return line is evaporated by heat inleak, and so a liquid is difficult to be stored in a liquid-return line.

FIG. 6 illustrates the main part of the distillation apparatus shown in FIG. 5, and describes the n-th distillation column Dn.

The gas from the bottom part of the former distillation column flows through the valve 10 and the gas-feeding line 11 to the top part of the distillation column 12. The gas from the top part of the distillation column 12 flows through the gas line 13 to the condenser 14. This gas is cooled therein by a cooling fluid such as liquefied nitrogen from the line 15, and then is liquefied and flows to the liquid line 16. A part of liquid flowing in the liquid line 16 flows into the liquid-return line 17, while the remainder thereof flows into the liquid-reflux line 18 and is fed to the top part of the distillation column 12 as a reflux liquid.

The liquid flowing in the liquid-return line 17 is returned through the valve 19 to the bottom part of the former distillation column. In this case, as shown in FIG. 6, the valve 19 is opened at the time point when a liquid head pressure $\Delta P1$ originating from the difference in height from the midstream of the liquid line 16 to the valve 19 provided on the liquid-return line 17 becomes higher than the pressure difference $\Delta P2$ between the former distillation column and the distillation column 12, i.e. the time point when the liquid-return line 17 and a part of the liquid line 16 are filled with the liquid. Then, this pressure difference is used as driving force so that the liquid is returned to the bottom part of the former distillation column.

However, the pipe of the liquid-return line 17 has a small inner diameter of 3 to 20 mm in order to decrease liquid hold-up. The liquid flowing from the condenser 14 to the liquid-return line 17 is evaporated by heat inleak so as to become a gas, and then this gas may become an upward flow in the liquid-return line 17, or may become bubbles and stored in the line. Therefore, a liquid may become difficult to be stored in the liquid-return line 17, and it may be difficult to obtain the liquid head pressure required for the return to the former distillation column.

Herein, in the conventional distillation columns shown in FIG. 2 to FIG. 5, the distillation column at the recovery part may not exit depending on the yield of the desired component.

[Non-patent Reference 1] YAMAMOTO Hiroshi, "Atomic Energy Chemical Engineering", pages 10-48, published by the Nikkan Kogyo Shimbun, Ltd., 1976

[Non-patent Reference 2] KANBE Takashi, et al., "Taiyo Nippon Sanso Technical Report" (23) 20-25 (2004)

[Non-patent Reference 3] KIHARA Hitoshi, et al., "Taiyo Nippon Sanso Technical Report" (23) 14-19 (2004)

SUMMARY OF THE INVENTION

Therefore, an object of the present invention is to certainly obtain a sufficient liquid head pressure for the return in the case where the return of liquid to the former distillation column is performed by using the liquid head pressure of the liquid obtained by liquefaction at a condenser in a distillation apparatus for a cascade process in which a plurality of distillation columns is connected in series and which is used for enrichment of an isotope.

In order to solve the aforementioned object, the present invention is a distillation apparatus including:

a distillation column group in which a plurality of distillation columns including a condenser and a reboiler is connected in the form of a cascade;

a gas-feeding line which feeds gas from the distillation column to a latter distillation column by using pressure difference between the distillation columns in the distillation column group;

a gas line which introduces the gas from the distillation column to the condenser attached to the distillation column;

a liquid line which withdraws a condensed liquid from the condenser;

a liquid-reflux line which introduces a part of the condensed liquid from the liquid line to the distillation column;

a liquid-return line which returns the remainder of the condensed liquid from the liquid line to a former distillation column;

a valve provided on the liquid-return line; and a bypass line which connects the liquid-return line and the gas line so as to flow an evaporated gas generated in the liquid-return line to the gas line.

In the present invention, it is preferable that the position at which the bypass line and the gas line are connected be higher than the position at which the liquid-reflux line and the distillation column are connected and that the position at which the bypass line and the liquid-return line are connected be lower than the position at which the liquid line and the liquid-reflux line are connected.

Also, in the present invention, it is preferable that the inner diameter of a pipe of the liquid-return line be 20 mm or less.

Also, in the present invention, it is preferable that the pipe of the liquid-return line from the lower part than the position at which the bypass line and the liquid-return line are connected to the vicinity of the valve have a vacuum insulation structure.

Also, in the present invention, it is preferable that the pipe of the liquid-return line from the lower part than the position at which the bypass line and the liquid-return line are connected to the vicinity of the valve have a double tube so as to be cooled by a cooling fluid.

Also, in the present invention, it is preferable that the cooling fluid be the same as a cooling source of the condenser.

Also, in the present invention, it is preferable that a length of the double tube be longer than the length in which the liquid head pressure required to return the condensed liquid to the former distillation column is obtained.

Also, a distillation apparatus of the present invention is preferably an enricher for isotopes or structural isomers.

According to the present invention, the bypass line is provided so that the gas generated in the liquid-return line immediately flows into the bypass line, and no gas remains in the liquid-return line. As a result, the liquid-return line is certainly filled with the liquid, and a liquid head pressure is certainly obtained, and the liquid can be returned to the former distillation column.

Therefore, according to the present invention, it is possible to stably operate the distillation process without using rotary machines such as liquid pump. Accordingly, in the enrichment of the mixture including structural isomers or isotopes, the cost for operation required for startup is reduced, and productivity is improved dramatically.

In addition, the pipe of the liquid-return line from the lower part than the position at which the bypass line and the liquid-return line are connected to the vicinity of the valve is vacuum-insulated or cooled by a cooling fluid. Therefore, the generation of gas can be prevented, and the storage of liquid is ensured.

Figure 1:
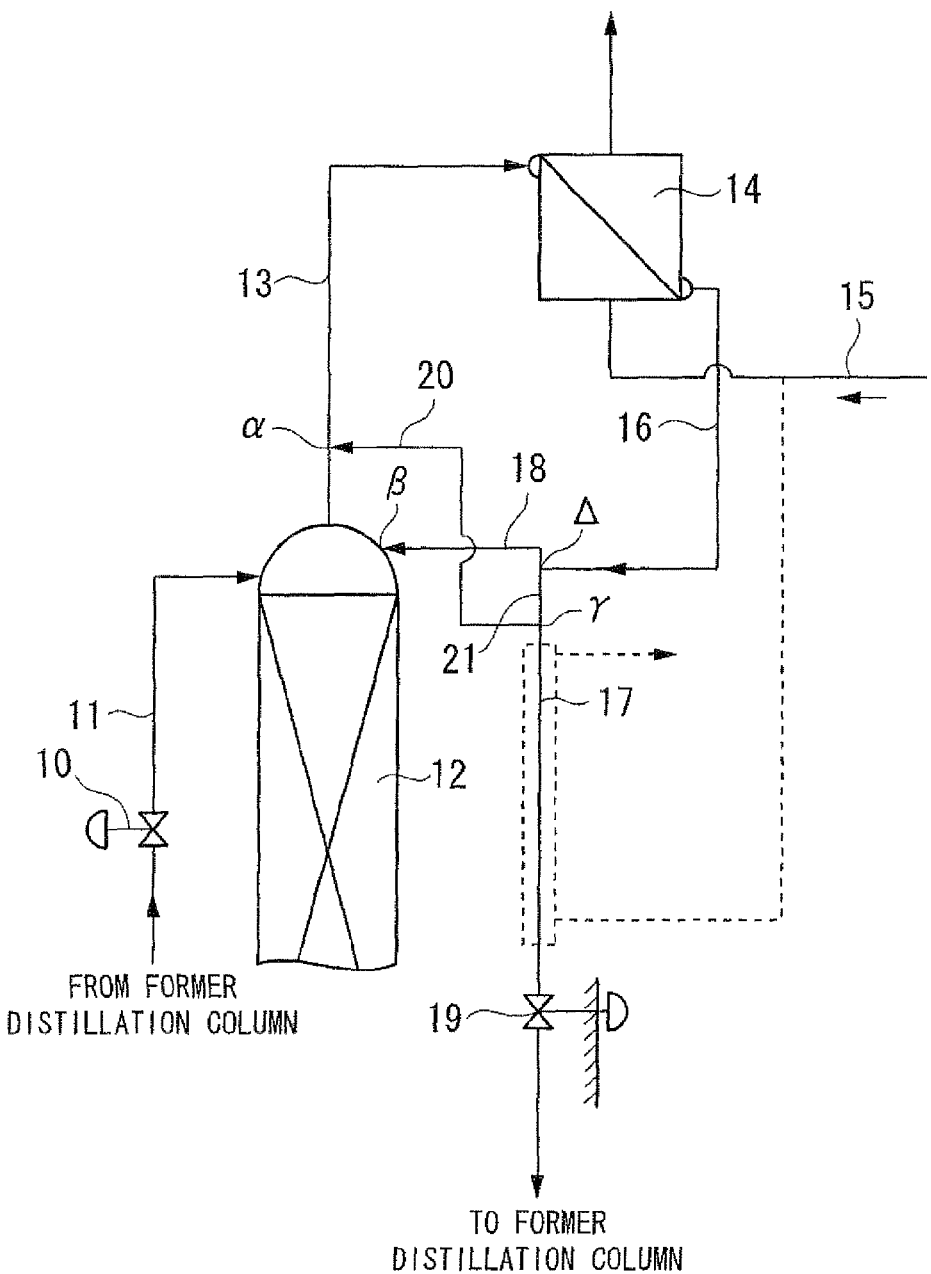
FIG. 1 is a schematic diagram illustrating a main part of a distillation apparatus of the embodiment of the present invention.
Figure 2:
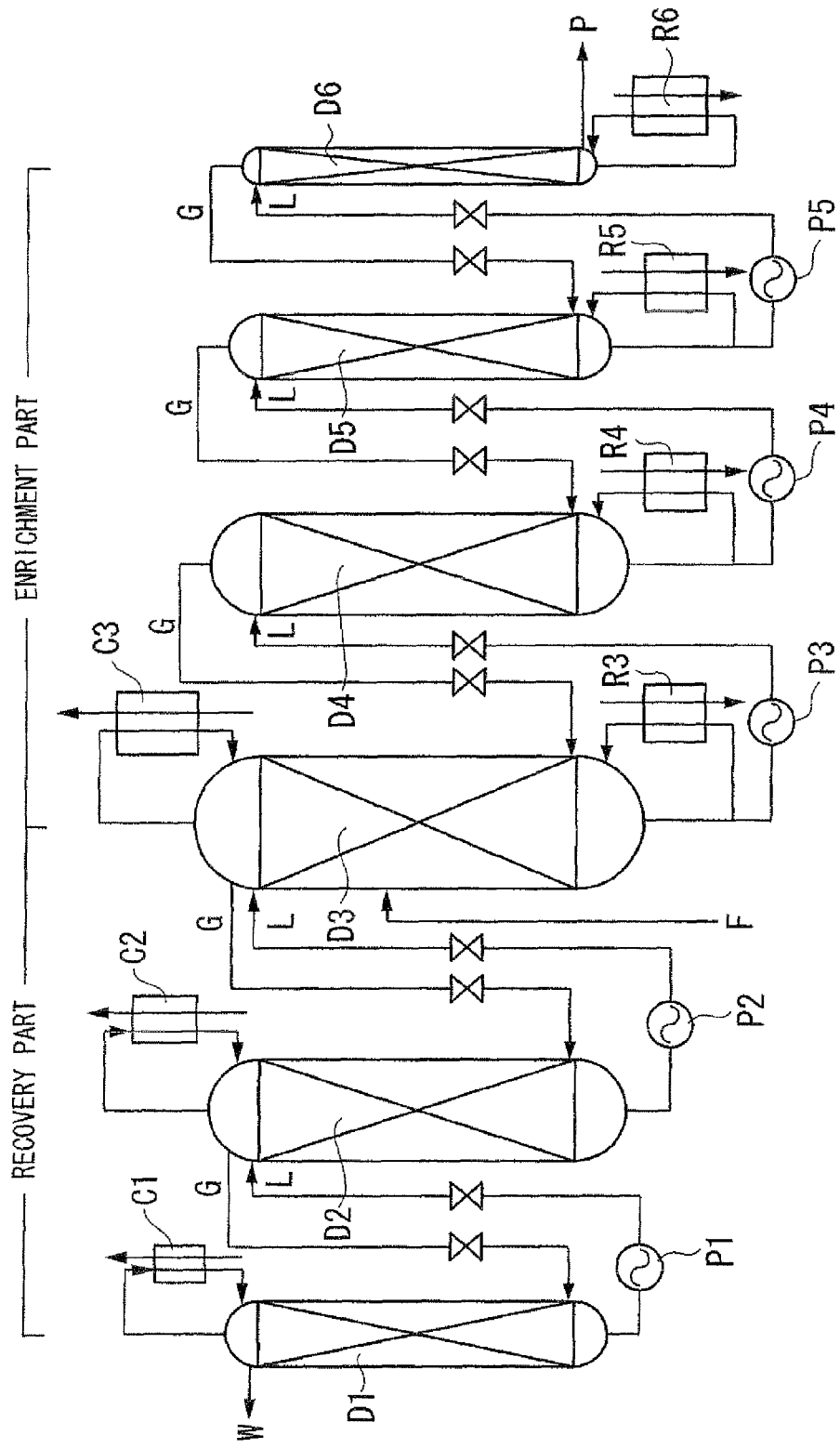
FIG. 2 is a schematic diagram illustrating a conventional distillation apparatus.
Figure 3:
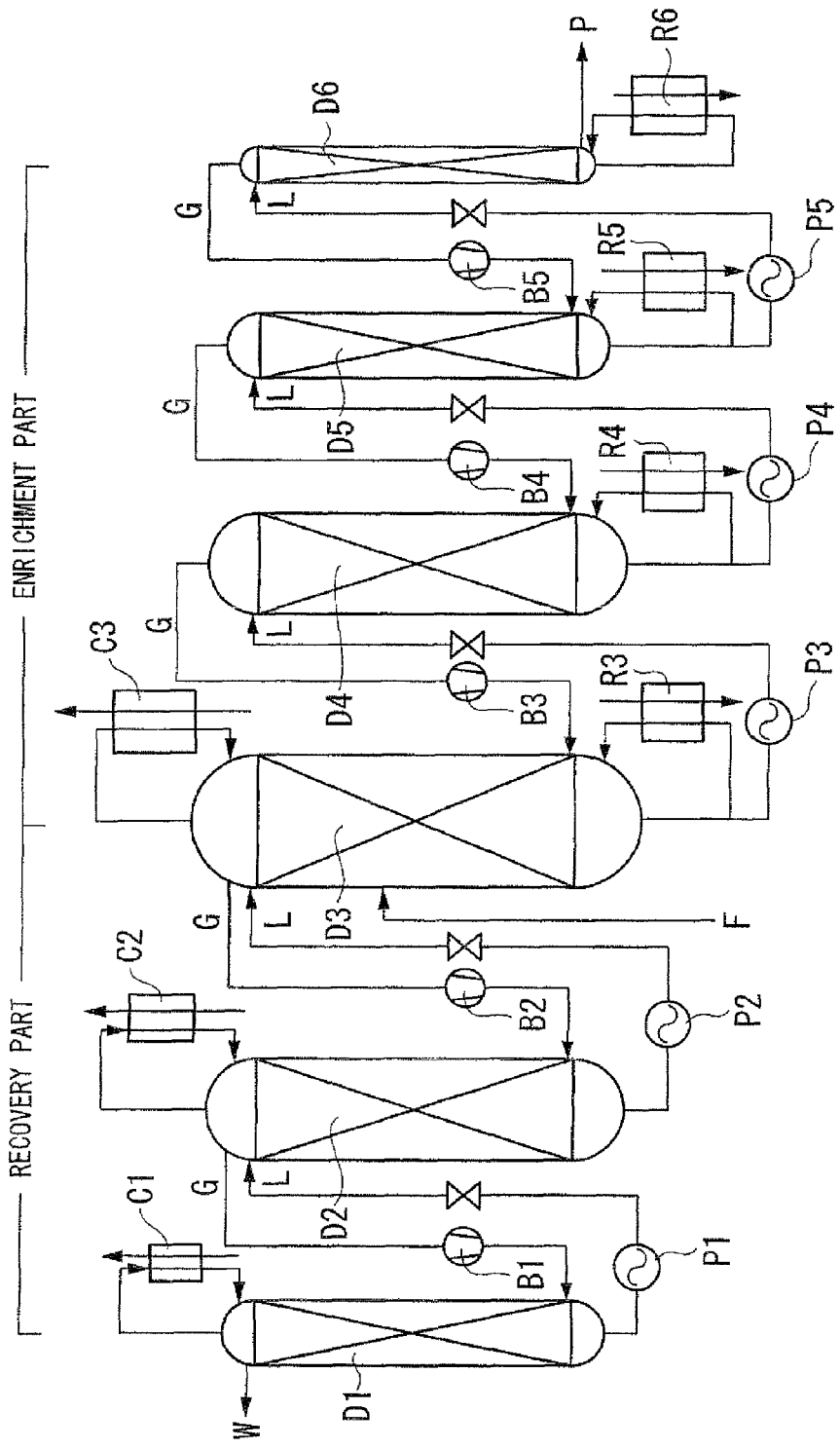
FIG. 3 is a schematic diagram illustrating a conventional distillation apparatus.
Figure 4:
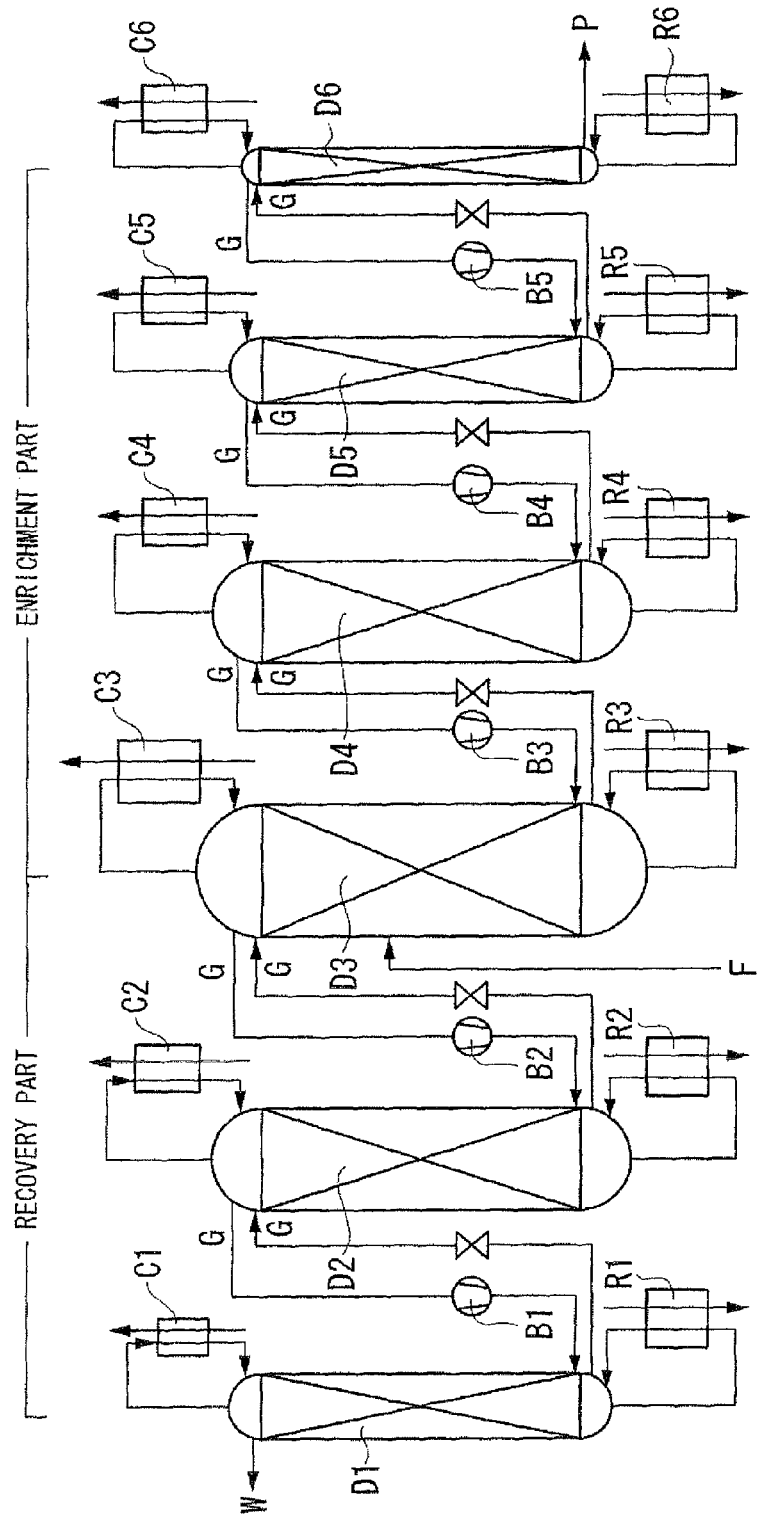
FIG. 4 is a schematic diagram illustrating a conventional distillation apparatus.
Figure 5:
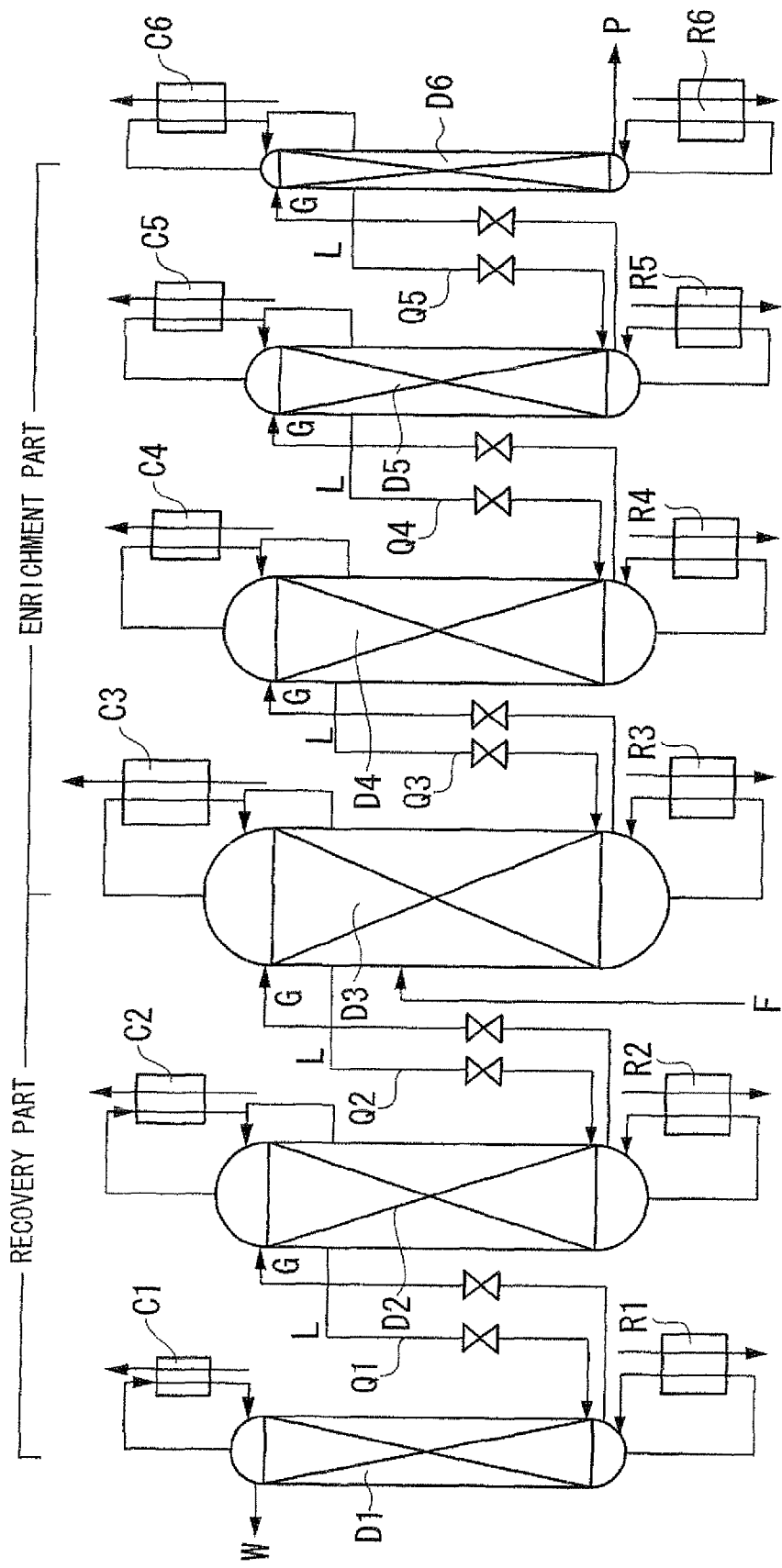
FIG. 5 is a schematic diagram illustrating a conventional distillation apparatus.

The reference numerals shown in these figures are defined as follows:

11 represents a gas-feeding line, 12 represents a distillation column, 13 represents a gas line, 14 represents a condenser, 16 represents a liquid line, 17 represents a liquid-return line, 18 represents a liquid-reflux line, and 20 represents a bypass line.

DETAILED DESCRIPTION OF THE INVENTION

FIG. 1 illustrates a top part of a distillation column as an example of cryogenic separation of an isotope regarding an embodiment of the present invention. The same reference numerals are given to the same constitutional features as in FIG. 6, and the explanations are simplified.

Figure 6:
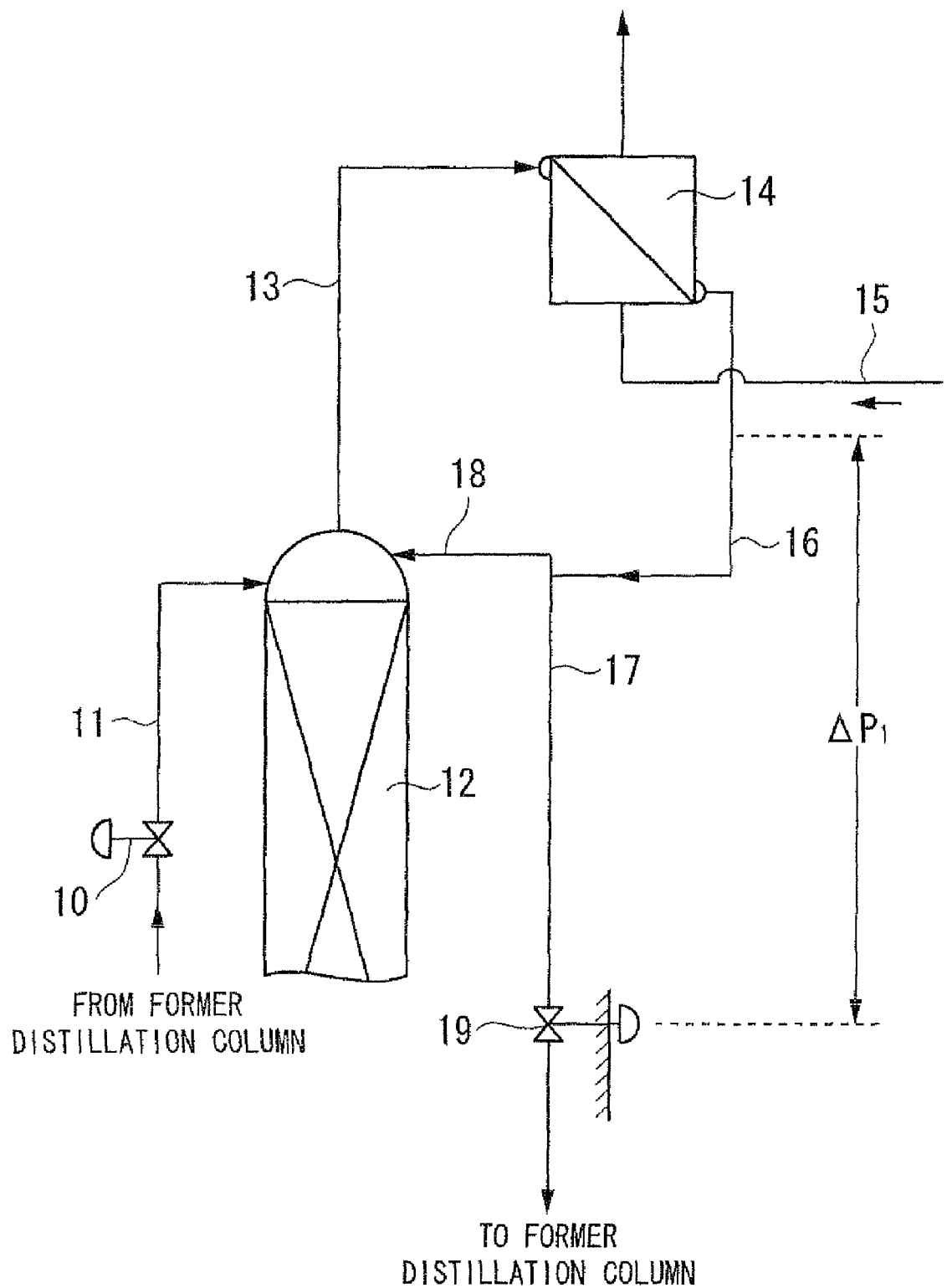
FIG. 6 is a schematic diagram illustrating a main part of a conventional distillation apparatus.

This example is different from the apparatus shown by FIG. 6 in that a bypass line 20 which connects a liquid-return line 17 and a gas line 13 is provided.

Also, the position $\alpha$ at which the bypass line 20 and the gas line 13 are connected is higher than the position $\beta$ at which a liquid-reflux line 18 and a distillation column 12 are connected, and the position $\gamma$ at which the bypass line 20 and the liquid-return line 17 are connected is lower than the position $\Delta$ at which a liquid line 16 and the liquid-reflux line 18 are connected. Herein, these height relationships are in the vertical direction when the distillation column stands in the vertical direction.

In the early period of cooling of the distillation column, the liquid produced by liquefaction in a condenser 14 reaches a branch point A (position $\Delta$) through the liquid line 16. At the branch point A, the liquid line 16 is connected to the liquid-reflux line 18 for the distillation column 12 and the liquid-return entry line 21 which is an upstream part of the lower liquid-return line 17.

Return to the former distillation column has priority over reflux to the distillation column 12, and therefore, the liquid-reflux line 18 is surely in an upward direction, and the liquid-return entry line 21 is surely in a downward direction.

The liquid firstly flows down in the liquid-return entry line 21, further flows down at a branch point B (position $\gamma$) as it is, and then flows into the liquid-return line 17.

In the liquid-return line 17, for the purpose of reduction of liquid hold-up, the diameter of the pipe is small, and the inner diameter is about 20 mm or less and particularly about 3 to 20 mm. Also, for the purpose of keeping a liquid head pressure (liquid head), the length of the liquid-return line 17 is 3 m or more and several tens of meters or less.

Therefore, even though the pipe of the liquid-return line 17 is thermally insulated with perlite, etc., the velocity of the gas, which is generated in the liquid-return line 17 and rises up, may reach several m/s in the early period of cooling.

As shown in FIG. 1, by providing the bypass line 20, the gas generated in the liquid-return line 17 rises up in the liquid-return line 17, flows into the bypass line 20 at the branch point B (position $\gamma$), and is released in the entrance of the condenser 14 or the top (gas phase) of the distillation column 12.

Therefore, the evaporated gas does not prevent the current of the liquid which flows down in the liquid-return entry line 21, and the liquid is likely to flow into the liquid-return line 17.

In this way, the liquid-return line 17 is cooled gradually, and the liquid is stored therein. In the case where the valve 19 of the liquid-return line 17 is opened when the liquid head is saved sufficiently, the liquid is returned to the former distillation column by pressure difference.

The flow rate of the liquid to be returned is the rate obtained by subtracting the product rate withdrawn among the distillation column 12 to the last distillation column from the rate of the gas fed into the distillation column 12 from the former distillation column. This flow rate is determined by itself on the basis of material balance. In detail, the material balance is maintained by adjusting the valve 19 of the liquid-return line 17 so that the liquid level in the bottom of the distillation column 12 becomes constant.

Meanwhile, among the liquid obtained by liquefaction at the condenser 14 of the distillation column 12, the liquid, which is not returned to the former distillation column, is refluxed to the top of the distillation column 12 through the liquid-reflux line 18.

Herein, it is preferable that the connection position $\alpha$ of the bypass line 20 on the side of the distillation column 12 be sufficiently higher than the position $\beta$ of the liquid-reflux line 18 on the distillation column 12. This is because the liquid is prevented from flowing to the bypass line 20 when the liquid-return entry line 21, the bypass line 20, and the liquid-return line 17 are cooled sufficiently.

Herein, in the case of the process which is cryogenically performed such as cryogenic separation, as shown by the dashed line of FIG. 1, the return of the liquid to the distillation column becomes very certain when the pipe of the liquid-return line 17 is modified to have a double tube and externally cooled by a cooling fluid. At this time, it is preferable that a cooling fluid for cooling the condenser 14, which is flowed from the line 15, be split-flowed and used as a cooling fluid used for cooling. Also, in the case where cooling by a cooling fluid is not performed, the liquid-return line 17 may have a vacuum insulation structure.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

According to the present invention, in the enrichment of the mixture including structural isomers or isotopes, the cost for operation required for startup is reduced, and productivity is improved dramatically. Accordingly, the present invention is industrially useful.

What is claimed is:

1. A distillation apparatus comprising:
a distillation column group in which a plurality of distillation columns comprising a condenser and a reboiler is connected in the form of a cascade;
a gas-feeding line which feeds gas from a distillation column to a latter distillation column by using pressure difference between the distillation columns in the distillation column group;
a gas line which introduces the gas from the distillation column to the condenser attached to the distillation column;
a liquid line which withdraws a condensed liquid from the condenser;
a liquid-reflux line which introduces a part of the condensed liquid from the liquid line to the distillation column;
a liquid-return line which returns the remainder of the condensed liquid from the liquid line to a former distillation column;
a valve provided on the liquid-return line; and
a bypass line which connects the liquid-return line and the gas line so as to flow an evaporated gas generated in the liquid-return line to the gas line, wherein
a position at which the bypass line and the gas line are connected is higher than a position at which the liquid-reflux line and the distillation column are connected, and
a position at which the bypass line and the liquid-return line are connected is lower than a position at which the liquid line and the liquid-reflux line are connected.

2. A distillation apparatus according to claim 1, wherein an inner diameter of a pipe of the liquid-return line is 20 mm or less.

3. A distillation apparatus according to claim 1, wherein a pipe of the liquid-return line from a lower part than a position at which the bypass line and the liquid-return line are connected to the vicinity of the valve has a vacuum insulation structure.

4. A distillation apparatus according to claim 1, wherein a pipe of the liquid-return line from a lower part than a position at which the bypass line and the liquid-return line are connected to the vicinity of the valve has a double tube so as to be cooled by a cooling fluid.

5. A distillation apparatus according to claim 4, wherein the cooling fluid is the same as a cooling source of the condenser.

6. A distillation apparatus according to claim 4, wherein a length of the double tube is longer than a length in which a liquid head pressure required to return the condensed liquid to the former distillation column is obtained.

7. A distillation apparatus according to claim 1 which is an enricher for isotopes or structural isomers.

* * * * *